United States Patent [19]

Kmiec et al.

[11] Patent Number: 5,419,609
[45] Date of Patent: May 30, 1995

[54] ENERGY ISOLATION APPARATUS FOR AN AUTOMOTIVE VEHICLE

[75] Inventors: Timothy M. Kmiec, Rochester Hills; Glenn P. Vangelderen, West Bloomfield; Joseph J. Melotik, White Lake, all of Mich.

[73] Assignee: Ford Motor Company, Dearborn, Mich.

[21] Appl. No.: 311,287

[22] Filed: Sep. 23, 1994

Related U.S. Application Data

[63] Continuation of Ser. No. 1,611, Jan. 7, 1993, abandoned.

[51] Int. Cl.6 .............................................. B62D 25/08
[52] U.S. Cl. ..................... 296/188; 296/189; 296/37.2
[58] Field of Search .................... 1/611; 296/37.2, 188, 296/189, 195; 293/133

[56] References Cited

U.S. PATENT DOCUMENTS

| 2,195,688 | 4/1940 | Windberger | 296/37.2 |
| 2,497,173 | 2/1950 | Kossow | 296/37.2 X |
| 2,660,348 | 11/1953 | Müller | 296/37.2 |
| 3,627,373 | 12/1971 | Fox et al. | 296/195 |
| 3,794,342 | 2/1974 | Froumajou et al. | 296/189 X |
| 3,883,166 | 5/1975 | Cadiou | 293/133 |
| 4,533,169 | 8/1985 | Rauthmann et al. | 296/37.2 |
| 4,563,035 | 1/1986 | Hirakami et al. | 296/195 |
| 4,573,724 | 3/1986 | Campen | 293/136 |
| 4,580,831 | 4/1986 | Umeda | 296/195 |
| 4,684,151 | 8/1987 | Drewek | 296/189 |
| 4,950,031 | 8/1990 | Mizunaga et al. | 296/189 |

FOREIGN PATENT DOCUMENTS

| 120191 | 5/1990 | Japan | 296/195 |
| 2072588 | 10/1981 | United Kingdom . | |

Primary Examiner—Dennis H. Pedder
Attorney, Agent, or Firm—Gregory P. Brown; R. L. May

[57] ABSTRACT

An automotive vehicle of the type having a front end, a rear end, a front pair of road wheels and a rear pair of road wheels located respectively adjacent to front and rear ends is disclosed. The vehicle also includes a passenger compartment area extending longitudinally between front and rear road wheels, a pair of frame members and a bumper member disposed generally transverses to the frame members. The vehicle further includes a storage compartment disposed longitudinally forward of the bumper member bounded by a plurality of body panel members and an isolation mechanism which isolates the storage compartment from longitudinal loads applied to the bumper member from a rear end collision to minimize the magnitude of the loads acting on the storage compartment.

13 Claims, 3 Drawing Sheets

ENERGY ISOLATION APPARATUS FOR AN AUTOMOTIVE VEHICLE

This is a continuation of application Ser. No. 08/001,611, filed Jan. 7, 1993, now abandoned.

BACKGROUND OF THE INVENTION

1. Field of the Invention

The present invention relates to an apparatus which transfers the energy of a rear end collision of an automotive vehicle away from a storage compartment area located at the rear end section of the vehicle.

2. Disclosure Information

A typical rear end section of an automotive vehicle includes a storage compartment area surrounded by a plurality of interior body panel members. This storage compartment area can, for example, include the trunk area, a fuel tank storage area, a rear axle storage area or the like.

During a rear end collision of the vehicle, longitudinal loads are applied to the rear of the vehicle directed against the storage compartment area. As used herein, longitudinal loads mean those loads which act generally parallel to the longitudinal axis of the vehicle. These longitudinally applied loads may compromise the available area in the storage compartment space resulting in undesirable effects on the vehicle. It would therefore be desirable to direct the energy of the longitudinally applied loads away from the storage compartment area of the vehicle.

One known way of absorbing the energy of a rear end collision has been to use energy absorbing bumpers. Generally, these bumpers include flexible polymeric materials and plastic foams which dissipate the energy of the contact before it can be transferred to the vehicle body structure. Energy absorbing bumpers work well in applications involving longitudinal loads of small magnitude. However, when the longitudinal load exceeds a predetermined magnitude, the energy absorbing bumper can no longer fulfill its intended function of absorbing the energy from the load.

U.S. Pat. No. 3,794,342 proposes an energy absorbing system for an automotive vehicle wherein a shoe provided in front of each front wheel or at the rear of each rear wheel absorbs the energy of a collision. The shoe deforms plastically under the imposition of a load to absorb a part of the energy involved in the collision. However, since the shoe deforms plastically to absorb the energy, the storage compartment area located at the rear of the vehicle may still be subjected to loads having a magnitude which could compromise the available space of the storage area. The system of the '342 simply absorbs the energy of a collision and does not direct the energy of the collision away from a predetermined area at the rear of the vehicle.

It would therefore be desirable to develop an apparatus which would transfer or direct the energy of a longitudinally applied load away from a predetermined storage compartment area of the rear of the vehicle to another, less critical part of the automotive vehicle such as one of the rear wheels of the vehicle.

SUMMARY OF THE INVENTION

Responsive to deficiencies in the prior art, there is disclosed herein an automotive vehicle of the type having a front end and a rear end and having a front pair of road wheels and a rear pair of road wheels located respectively adjacent the front and rear ends, a passenger compartment area extending longitudinally between the front and rear pair of road wheels, a pair of frame members disposed generally parallel to the longitudinal axis of the vehicle and a bumper member disposed generally transverse to the frame members at the rear end of the vehicle. The vehicle further comprises a storage compartment disposed longitudinally forward of the bumper member and bounded by a plurality of body panel members as well as isolation means for isolating the storage compartment from longitudinal loads applied to the bumper member to minimize the magnitude of the loads acting on the storage compartment. In one embodiment, the isolation means comprises force transferring means for transferring the force of the longitudinal loads acting on the bumper member away from the storage compartment to at least one of the rear vehicle road wheels.

In another embodiment, the vehicle further includes a floor pan member extending longitudinally forward from the bumper member and having a pocket of predetermined depth which receives a vehicle tire assembly. The pocket is disposed between the bumper member and the storage compartment and the isolation means further comprises means for retaining the tire assembly in the pocket upon the application of the longitudinal load against the bumper member so that at least a portion of the energy of the longitudinally applied load may be absorbed by the tire assembly in the pocket.

Certain advantages are gained in using the present invention during rear end collisions or in longitudinal loading of the rear bumper member of the vehicle. During such collisions, the present invention directs the longitudinal loads away from the storage compartment area to at least one of the rear vehicle wheels wherein the energy of the collision can be absorbed more readily. Furthermore, by retaining the spare tire assembly in its pocket in the floor pan member, the spare tire assembly can absorb the energy of the longitudinally applied loads prior to the loading of the storage compartment area.

These and other objects, features and advantages will be apparent from the drawing, description and claims which follow.

DETAILED DESCRIPTION OF THE PREFERRED EMBODIMENTS

Figure 1:
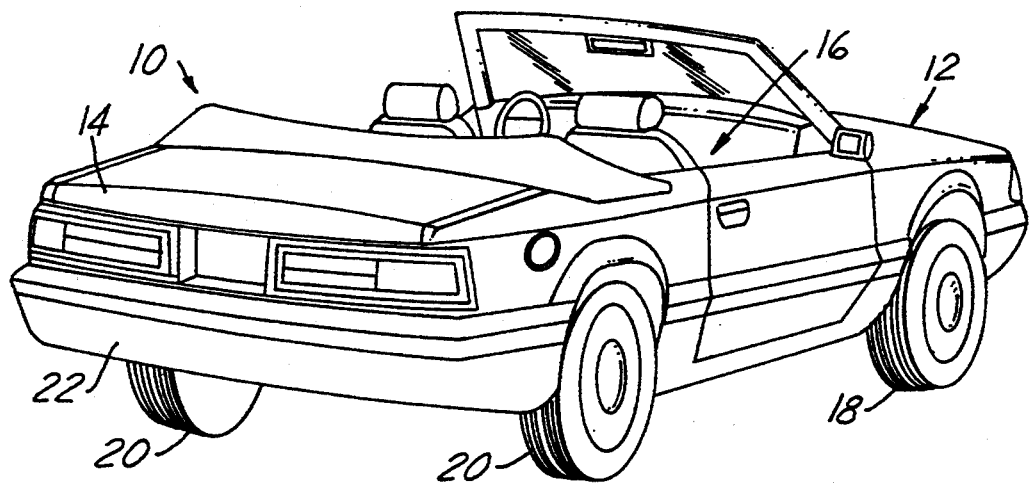
FIG. 1 is a perspective view of an automotive vehicle.

Referring now to the drawings, FIG. 1 shows an automotive vehicle 10 having a front end 12, a rear end 14 and a passenger compartment 16 extending between the front and rear ends. The vehicle includes a pair of front road wheels 18 and a pair of rear road wheels 20 located respectively adjacent the front end 12 and rear end 14 of the vehicle 10. A bumper member 22 is disposed at the rearmost end of the vehicle.

Figure 2:
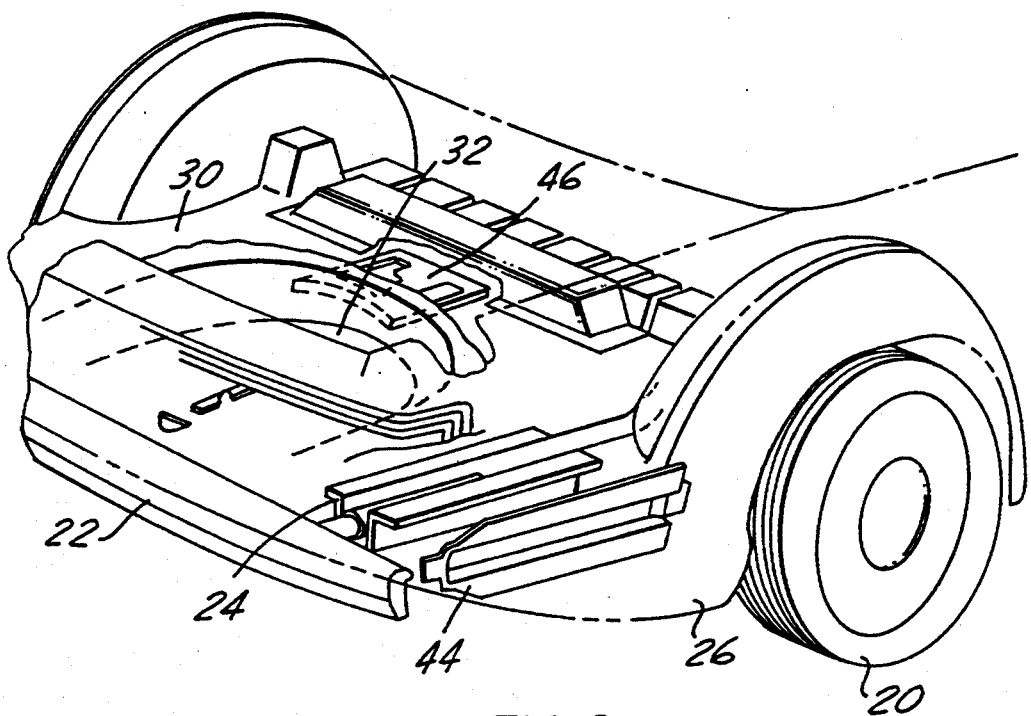
FIG. 2 is a perspective, partially sectioned view of a section of the vehicle in FIG. 1 structured in accord with the principles of the present invention.
Figure 3:
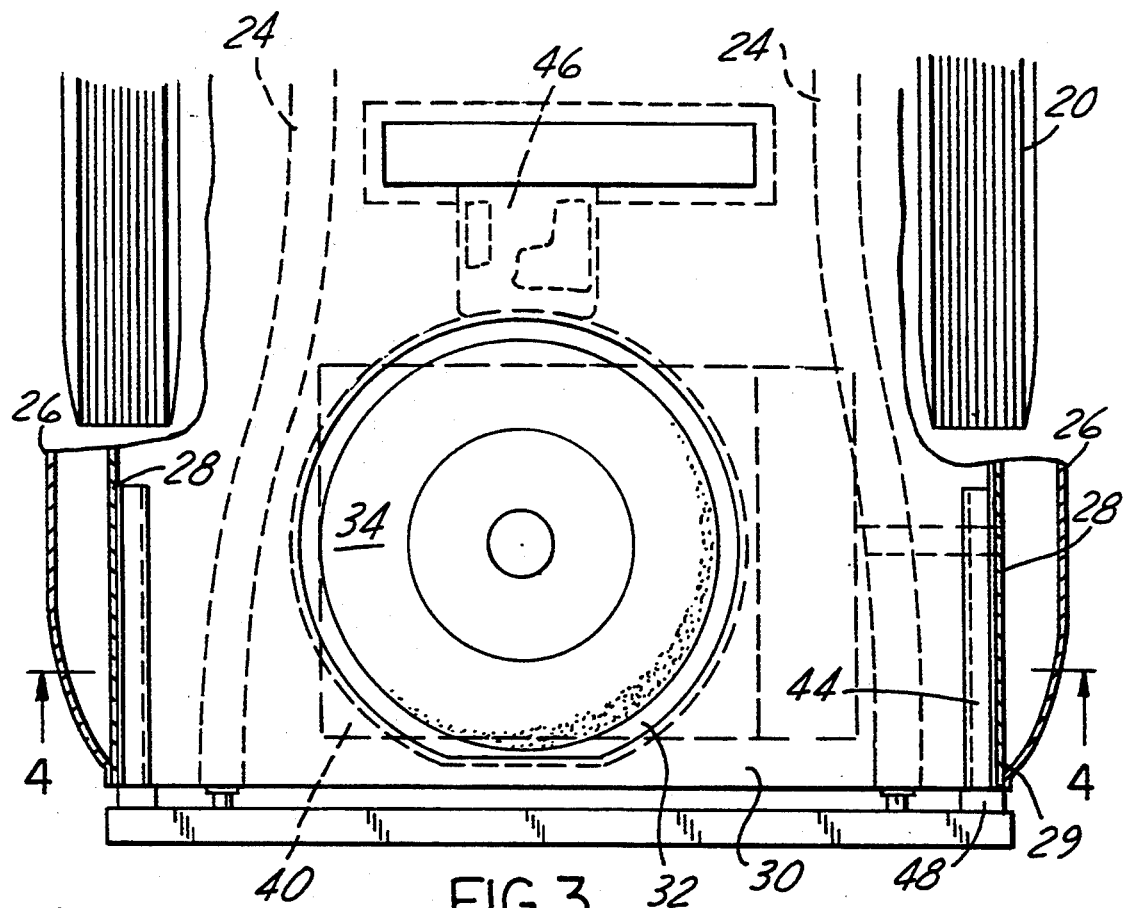
FIG. 3 is a top plan view of FIG. 2.

As more clearly illustrated in FIGS. 2 and 3, the vehicle 10 further includes a pair of longitudinally extending frame rails 24 disposed generally parallel to the longitudinal axis of the vehicle 10 as well as a plurality of body panel members. The body panel members illustrated are an outer quarter panel member 26, and an inner quarter panel member 28 secured thereto such as by weld 29 which are disposed between the rear tire 20 and the bumper member 22. The vehicle 10 also includes a floor pan body panel member 30 which extends longitudinally forward from the bumper member 22 and which is generally perpendicular to a vertical axis through the vehicle. The vehicle 10 may also include other body panel members which are not shown herein. The present invention is not meant to be limited solely to those body panel members illustrated. The floor pan 30 includes a pocket 32 of predetermined depth which receives a vehicle spare tire assembly 34 therein. The pocket 32 is disposed between the bumper member 22 and the rear wheels 20 of the vehicle.

The body panel members 26, 28 and 30 surround a storage compartment 40 disposed longitudinally forward of the bumper member 22. The storage compartment 40 defines a space having a predetermined volume for receiving any of a number of automotive components therein. For example, and as illustrated in the present application, the storage area 40 comprises a fuel tank assembly but may also comprise an area for housing a rear axle member or the like. The present invention is not meant to be limited solely to a storage compartment defining a fuel tank assembly.

Figure 4:
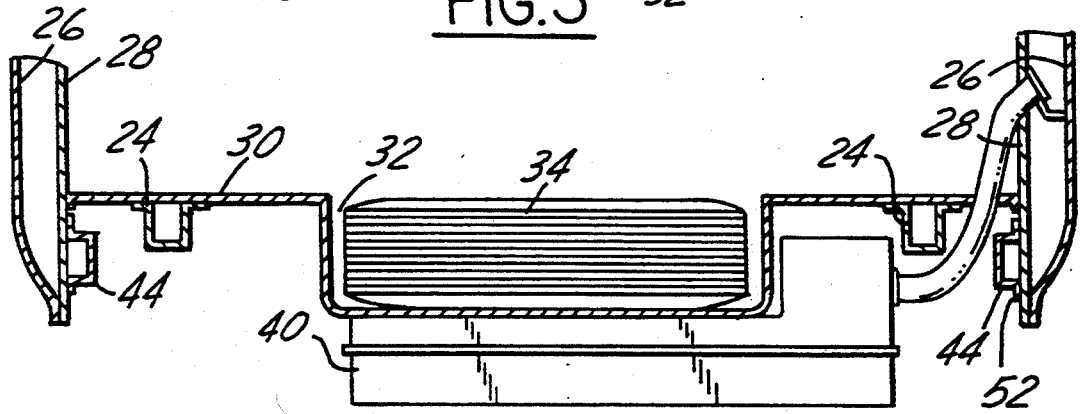
FIG. 4 is a cross-sectional view along line 4—4 of FIG. 3.

As illustrated in FIGS. 2-4, the vehicle 10 further includes isolation means for isolating the storage compartment 40 from longitudinal loads which may be applied to the bumper member 22 such as in a rear end collision of the vehicle. The isolation means minimizes the magnitude of the force of the loads acting on the storage compartment 40. The isolation means comprises a beam member, such as tire pusher beam 44, as well as a retaining web 46. The tire pusher beam 44 is secured such as by welding or other known means, to the inner quarter panel body member 28 and is disposed longitudinally between the bumper member 22 and the rear vehicle tire 20. A plastic or other synthetic polymeric material block 48 is disposed between one end of the tire pusher member 44 and the bumper member 22.

As seen more clearly in FIG. 4, the tire pusher member 44 is hat-shaped in cross-section and includes a U-shaped channel member with a pair of flanges 52 projecting therefrom. The flanges 52 are secured to the inner quarter panel member 28. The hat-shaped cross-sectional configuration of the tire pusher member 46 allows it to resist deformation in a longitudinal direction under the application of longitudinal loads upon the bumper member, resulting in the transferring of the load through the tire pusher member 44 to the vehicle wheel 20. As illustrated, each lateral side of the vehicle includes a tire pusher member 44, however, the vehicle 10 may include only a single tire pusher member disposed at one side of the vehicle. As will become apparent from the description below, the tire pusher member 44 comprises force transferring means which transfers the force of a longitudinally applied load acting on the bumper member 22 away from the storage compartment 40 to at least one of the rear vehicle wheels 20.

As stated above, the vehicle 10 includes isolation means which further comprises the retaining web 46. The retaining web 46 is secured to the floor pan member 30 and disposed directly adjacent the pocket 32 as shown in FIG. 3. The retaining web 46 can also be a hat-shaped cross-sectional member which resists plastic deformation under the application of longitudinal loads upon the bumper member 22. The retaining web 46 retains the spare tire assembly 34 in the pocket 32 of the floor pan member 30 when a longitudinal load is applied to the bumper member 22. It is advantageous to retain the spare tire assembly 34 in the pocket during a rear end collision of the vehicle 10 because the spare tire assembly 34 absorbs a portion of the energy of the collision due to its mass and structure.

Figure 5:
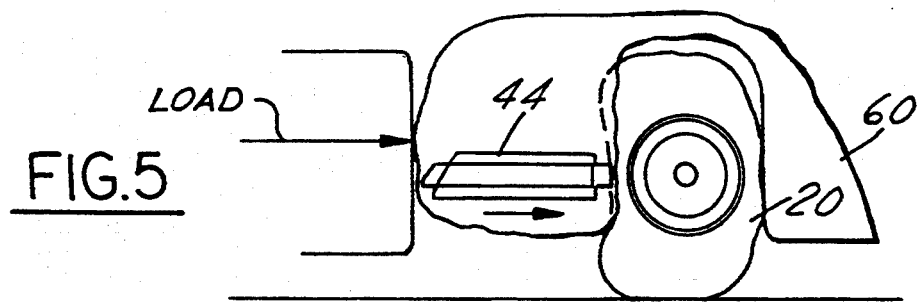
FIG. 5 is a diagrammatic view of the FIG. 2 after a longitudinal load has been applied to the vehicle.
Figure 6:
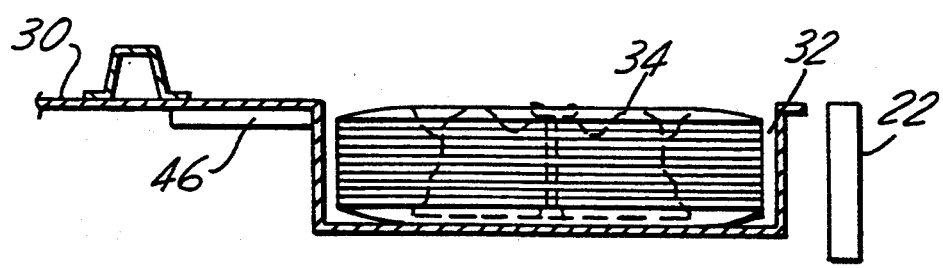
FIG. 6 is a cross-sectional view along line 6—6 of FIG. 3.
Figure 7:
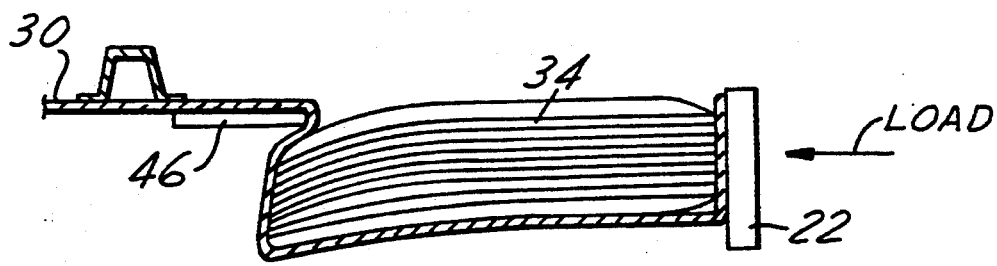
FIG. 7 is a view similar to FIG. 6 after longitudinal loading of the rear of the vehicle.

FIGS. 5–7 show the operation of the isolation means of the present invention after the vehicle has been subjected a rear end collision which applies longitudinal loads to the bumper member 20. As can be seen in FIG. 5, the tire pusher member 44 resists plastic deformation along its longitudinal axis and transfers the energy of the longitudinal loads from the bumper member to the rear vehicle wheel 20 which then absorbs the energy of the collision to minimize the magnitude of the forces transferred to the storage compartment area 40. If the magnitude of the longitudinal load exceeds a predetermined amount, the tire pusher member 26 may even force the rear vehicle wheel 20 into a body panel member located forward of the tire 20 such as the rocker panel 60 or other body panel member. As further shown in FIGS. 6 and 7, when a longitudinal load is applied to the bumper member, the pocket 32 of the floor pan member 30 shifts axially forward of the bumper toward the passenger compartment 16. The retaining web 46 resists deformation in this longitudinal direction such that the pocket 32 and the spare tire assembly 34 in the pocket 32 are shifted axially under the retaining web 46. In this manner, the retaining web 46 retains the spare tire assembly 34 in the pocket 32 of the floor pan member and the spare tire assembly 34 can also absorb some of the energy of the collision.

Various other modifications and alterations of the present invention will no doubt occur to those skilled in the art to which this invention pertains. For example, in the preferred embodiment, the tire pusher member 44 and the retaining web 46 are manufactured in a stamping operation from a carbon steel alloy material. However, these members may be fabricated with different cross-sectional shapes out of various known materials which resist plastic deformation along the longitudinal axes. These and all other variations which rely upon the teachings by which this disclosure has advanced the art are properly considered within the scope of this invention as defined by the appended claims.

What is claimed is:

1. An automotive vehicle of the type having a front end and a rear end and having a front pair of road wheels and a rear pair of road wheels located respectively adjacent said front and rear ends, a passenger compartment area between said front and rear pair of road wheels, a pair of frame members disposed generally parallel to the longitudinal axis of the vehicle and a bumper member disposed generally transverse to the frame members at said rear end, the vehicle comprising:

a storage compartment disposed longitudinally forward of the bumper member and bounded by a plurality of body panel members; and a tire pusher member of substantially constant cross-section, said cross-section being substantially smaller than a width of one of said rear wheels situated between said one rear wheel and said bumper member, said tire pusher member being constructed to engage said rear wheel when a forwardly directed load exceeding a pre-determined amount is imposed on said bumper member, said tire pusher member being operative to provide greater resistance to said load along its longitudinal axis than said rear wheel and which directs said load from said bumper member to said rear wheel whereby said rear wheel absorbs most of the energy of said forwardly directed load and the longitudinal deformation of said tire pusher member and said storage compartment is minimized.

2. A vehicle according to claim 1, wherein said tire pusher member comprises a beam member longitudinally extending between said bumper member and one of said rear vehicle road wheels and being secured to a body panel member extending from said rear wheel to said bumper member.

3. A vehicle according to claim 2, wherein said beam member comprises a beam having a hat-shaped cross-section operative to resist deformation under a load applied along a longitudinal axis thereof and which directs the applied load from the bumper member to said rear vehicle wheel.

4. A vehicle according to claim 1, wherein said vehicle further includes a floor pan member extending longitudinally forward from said bumper member and being generally perpendicular to a vertical axis through said vehicle, said floor pan member having a pocket of predetermined depth adapted to receive a vehicle tire assembly therein, said pocket being disposed between said bumper member and said storage compartment, and further comprising means for retaining said tire assembly in said pocket upon the application of said longitudinal load against said bumper member thereby permitting said vehicle tire assembly to absorb energy and minimize the deformation of said storage compartment.

5. A vehicle according to claim 4, wherein said retaining means comprises a web secured to said floor pan member between said pocket and a front of said storage compartment, said web being operative to resist plastic deformation under the application of the longitudinal loads upon said bumper member.

6. A vehicle according to claim 5, wherein said web is located adjacent said pocket so that under the imposition of the longitudinal load upon said bumper, said web is operative to resist deformation and said pocket and said tire assembly move axially under said web which is operative to retain said tire assembly in said pocket.

7. An automotive vehicle of the type having a front end and a rear end and having a front pair of road wheels and a rear pair of road wheels located respectively adjacent said front and rear ends, a passenger compartment area extending longitudinally between said front and rear pair of road wheels, a pair of frame members disposed generally parallel to the longitudinal axis of the vehicle and a bumper member disposed generally transverse to the frame members at said rear end, the vehicle comprising:

a storage compartment disposed longitudinally forward of the bumper member and bounded by a plurality of body panel members;

a tire pusher member of substantially constant cross-section, said cross-section being substantially smaller than a width of one of said rear wheels situated between said one rear wheel and said bumper member, said tire pusher member being constructed to engage said rear wheel when a forwardly directed load exceeding a pre-determined amount is imposed on said bumper member, said tire pusher member being operative to provide greater resistance to said load along its longitudinal axis than said rear wheel and which directs said load from said bumper member to said rear wheel whereby said rear wheel absorbs most of the energy of said forwardly directed load and the longitudinal deformation of said tire pusher member and said storage compartment is minimized; and a plastic block disposed between a rearward end of said force transferring means and said bumper.

8. A vehicle according to claim 7, wherein said tire pusher member comprises a beam member longitudinally extending between said bumper member and one of said rear vehicle road wheels and being secured to a body panel member extending from said rear wheel to said bumper member.

9. A vehicle according to claim 8, wherein said beam member comprises a beam having a hat-shaped cross-section operative to resist deformation under a load applied along a longitudinal axis thereof and which directs the applied load from the bumper member to said rear vehicle wheel.

10. A vehicle according to claim 9, wherein said vehicle further includes a floor pan member extending longitudinally forward from said bumper member and being generally perpendicular to a vertical axis through said vehicle, said floor pan member having a pocket of predetermined depth adapted to receive a vehicle tire assembly therein, said pocket being disposed between said bumper member and said storage compartment, and further comprising means for retaining said tire assembly in said pocket upon the application of said longitudinal load against said bumper member thereby permitting said vehicle tire assembly to absorb energy and minimize the deformation of said storage compartment.

11. A vehicle according to claim 10, wherein said retaining means comprises a web secured to said floor pan member between said pocket and a front of said storage compartment, said web being operative to resist plastic deformation under the application of the longitudinal loads upon said bumper member.

12. A vehicle according to claim 11, wherein said web is located adjacent said pocket so that when said pocket deforms under the imposition of the longitudinal load upon said bumper member, said web is operative to resist deformation and said pocket and said tire assembly move axially under said web which is operative to retain said tire assembly in said pocket.

13. An automotive vehicle of the type having a front end and a rear end and having a front pair of road wheels and a rear pair of road wheels located respectively adjacent said front and rear ends, a passenger compartment area extending longitudinally between said front and rear pair of road wheels, a pair of frame members disposed generally parallel to the longitudinal axis of the vehicle and a bumper member disposed generally transverse to the frame members at said rear end, a floor pan member extending longitudinally forward from said bumper member and being generally perpendicular to a vertical axis through said vehicle, said floor pan member having a pocket of predetermined depth adapted to receive a vehicle tire assembly therein, said pocket being disposed between said bumper member and said storage compartment, the vehicle comprising:
- a storage compartment disposed longitudinally forward of the bumper member and bounded by a plurality of body panel members;
- a hat-shaped tire pusher member longitudinally extending between said bumper member and one of said rear vehicle road wheels and being secured to a body panel member extending from said rear wheel to said bumper member, said tire pusher member being operative to provide greater resistance than said rear vehicle wheel under a load applied along a longitudinal axis thereof and which directs the applied load from said bumper member to said rear vehicle wheel whereby said rear wheel absorbs most of the energy of said forwardly directed load and the longitudinal deformation of said tire pusher member and said storage compartment is minimized; and
- a web secured to said floor pan member adjacent said pocket between said pocket and a front of said storage compartment, said web being operative to resist plastic deformation under the application of the longitudinal loads upon said bumper member, whereby said pocket deforms under the imposition of the longitudinal load upon said bumper member, said pocket and said tire assembly move axially under said web which retains said tire assembly in said pocket so that said tire assembly absorbs energy resulting from said longitudinal loads to minimize the deformation of said storage compartment.

* * * * *